UNITED STATES PATENT OFFICE.

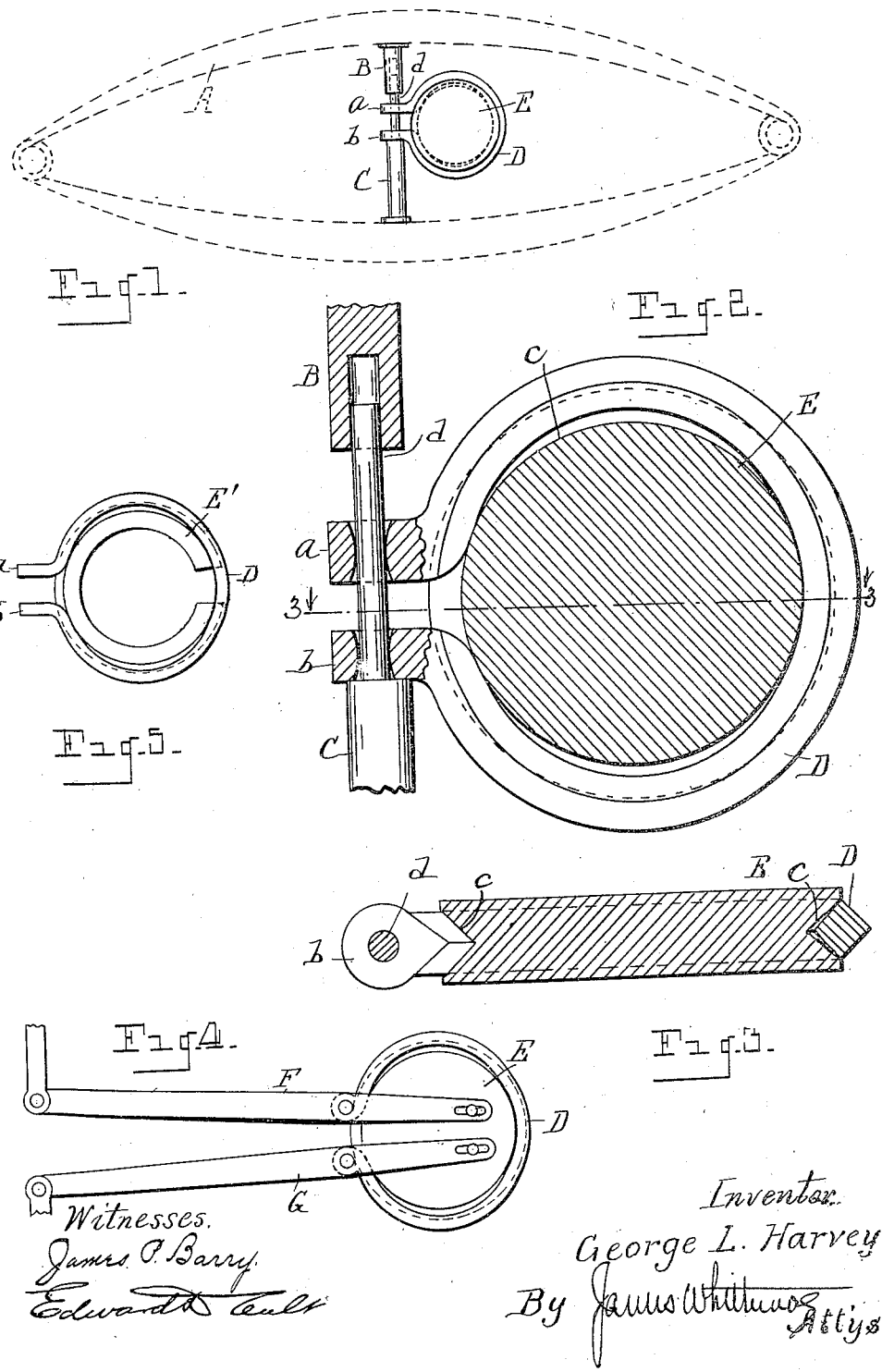

GEORGE LYON HARVEY, OF CHICAGO, ILLINOIS, ASSIGNOR TO HARVEY FRICTION SPRING COMPANY, OF CHICAGO, ILLINOIS, A CORPORATION OF ILLINOIS.

SHOCK-ABSORBER.

No. 886,501.　　Specification of Letters Patent.　　Patented May 5, 1908.

Application filed December 2, 1905. Serial No. 289,993.

*To all whom it may concern:*

Be it known that I, GEORGE L. HARVEY, residing at Chicago, in the county of Cook and State of Illinois, a citizen of the United States, have invented certain new and useful Improvements in Shock-Absorbers, of which the following is a specification, reference being had therein to the accompanying drawings.

The invention relates to yielding resistances commonly known as shock absorbers, the function of which is to absorb a portion of the energy used in deflecting a spring to prevent too violent a recoil.

The invention consists in the novel construction of means employed for this purpose as hereinafter set forth.

In the drawings, Figure 1 is an elevation of a shock absorber in connection with a vehicle spring illustrated in dotted lines; Fig. 2 is a longitudinal section through the shock absorber; Fig. 3 is a cross section thereof; Fig. 4 is an elevation of a modified construction; and Fig. 5 is a similar view of still another modification.

My improvement comprises essentially a contractible loop and a coöperating member embraced by said loop in frictional contact upon opposite sides but of a form having a slightly lesser length of contour. The ends of the loop are respectively connected to the movable member and the rigid support therefor so that during the movement of the former the loop will be contracted, thereby being drawn into a closer conformity to the contour of the coöperating member. During this contraction, the contracting points or portions of the surface of the loop will be pressed with a strong tension against the surface of the coöperating member, so as to cause a considerable frictional resistance, and frictional resistance will also be offered to the expansion of the loop when assuming its original form. Thus; a portion of the energy occasioning the movement will be absorbed and the recoil correspondingly diminished.

As illustrated in Fig. 1, A is a vehicle-spring of any suitable construction, it being indicated in the form of an elliptic spring. B and C are members projecting oppositely from the upper and lower portion of said spring and preferably having a telescopic engagement with each other. D is the spring loop preferably of slightly elliptic form and provided with laterally-projecting ends $a$ and $b$ which respectively engage the members B and C. E is the coöperating member which as illustrated is of circular form and of a size to fit the minor axes of the ellipse.

For holding the members D and E in proper relation to each other and also for increasing the bearing surface, the latter is preferably provided with a peripheral groove $c$ of a shape corresponding to the cross section of the loop, this being illustrated as diamond-shaped. The ends $a$ and $b$ of the loop may be attached in any suitable manner to the members B and C, and where desired lost motion may be provided so as to permit a certain amount of deflection of the spring before the shock absorber is brought into action. This is illustrated in Fig. 1 by sleeving the apertured ends $a$ and $b$ of the member D upon a reduced extension $d$ of the member C, which latter also telescopically engages the member B. In normal position of the spring, the member B is not however in contact with the ends $a$ of the loop, but is separated therefrom so as to permit a partial deflection of the spring before a contact is made. As a consequence, only excessive deflection of the spring will cause the member B to impinge the ends $a$ of the loop and exert a tension thereon which will cause the contraction of the loop.

Where it is desired, in place of the construction illustrated in Fig. 1, the shock absorber may be connected to the spring through the medium of levers such as F and G which diminish the degree of contraction of the loop relative to the movement of the spring. As illustrated, the levers F and G are fulcrumed on pins projecting from the member E and are pivotally connected respectively to the ends of the loop, while the outer ends of the levers are suitably connected to the opposite sides of the spring (not shown).

In Fig. 5 is illustrated a modification in which, in place of an absolutely rigid member E, a spring member E' is employed which is in the form of a split ring. This member E' is sufficiently rigid to cause the loop member D to conform to the same shape of contour, but at the same time the member E' is capable of flexing to a limited extent and will yield under excessive stresses. The effect of the construction is therefore to prevent a sudden arrest in the movement of deflection and also to absorb a portion of the energy by friction.

From the description above given, the operation of the shock absorber will be understood, but briefly is as follows: Whenever pressure is exerted upon the ends of the spring loop tending to contract the same, this pressure will also cause the contacting surfaces of the members D and E to be held together, and the contraction of the loop is therefore resisted by the friction between said surfaces. Furthermore, by making the angle of the groove $c$ slightly sharper than the angular cross section of the loop, a wedging action of the latter into the former is produced, which will increase the frictional resistance. The energy used in overcoming this resistance will be transformed to heat and will be dissipated through conduction and radiation.

What I claim as my invention is:—

1. A shock absorber comprising a spring loop having its ends respectively in operative relation to the relatively movable members, and a non-rotative coöperating member embraced by said loop and in frictional contact therewith.

2. A shock absorber comprising a spring loop having its opposite ends in the path of the relatively movable members, and a non-rotative coöperating member embraced by said loop of a different form.

3. A shock absorber comprising a contractible loop and a non-rotative coöperating resistance member embraced thereby of different contour, the contraction of said loop causing a relative springing and sliding of the contacting surfaces of said members, whereby frictional resistance to the contraction is developed.

4. A shock absorber comprising a contractible loop and a grooved member embraced by and frictionally engaging said loop, being of a different contour, whereby a relative springing and sliding of the contacting surfaces is caused by the contraction of the loop.

5. A shock absorber comprising a resilient member and a non-rotative non-resilient member having inter-engaging frictional surfaces which are non-parallel, substantially as described.

6. A shock absorber comprising a distortable resilient member and a non-rotative non-resilient member having engaging frictional surfaces arranged to give increased frictional area as the resilient member is distorted, substantially as described.

7. A shock absorber comprising a contractible member and a non-rotative coöperating resistance member therein having coacting frictional surfaces adapted to frictionally resist the contraction of said contractible member and to increase said resistance as said contraction is increased.

In testimony whereof I affix my signature in presence of two witnesses.

GEORGE LYON HARVEY.

Witnesses:
JAMES P. BARRY,
EDWARD AULT.